United States Patent
Land et al.

(10) Patent No.: US 7,334,156 B2
(45) Date of Patent: Feb. 19, 2008

(54) METHOD AND APPARATUS FOR RAID CONVERSION

(75) Inventors: Kris Land, Poway, CA (US); Lawrence John Dickson, National City, CA (US)

(73) Assignee: Tandberg Data Corp., Boulder, CO (US)

(*) Notice: Subject to any disclaimer, the term of this patent is extended or adjusted under 35 U.S.C. 154(b) by 763 days.

(21) Appl. No.: 10/779,378

(22) Filed: Feb. 13, 2004

(65) Prior Publication Data

US 2005/0182992 A1    Aug. 18, 2005

(51) Int. Cl.
*G06F 11/00* (2006.01)
(52) U.S. Cl. .............................. 714/7; 714/6
(58) Field of Classification Search .......... 714/6, 714/7
See application file for complete search history.

(56) References Cited

U.S. PATENT DOCUMENTS

| | | | |
|---|---|---|---|
| 5,479,653 A | 12/1995 | Jones | |
| 5,524,204 A | 6/1996 | Verdoorn, Jr. | |
| 5,574,851 A | 11/1996 | Rathunde | |
| 5,615,352 A | 3/1997 | Jacobson et al. | |
| 6,052,759 A | 4/2000 | Stallmo | |
| 6,058,489 A * | 5/2000 | Schultz et al. | 714/7 |
| 6,098,119 A * | 8/2000 | Surugucchi et al. | 710/10 |
| 6,154,853 A | 11/2000 | Kedem | |
| 6,275,898 B1 | 8/2001 | DeKoning | |
| 6,279,138 B1 * | 8/2001 | Jadav et al. | 714/800 |
| 6,347,359 B1 * | 2/2002 | Smith et al. | 711/114 |
| 6,516,425 B1 * | 2/2003 | Belhadj et al. | 714/6 |
| 6,557,123 B1 | 4/2003 | Wiencko et al. | |
| 6,922,752 B2 * | 7/2005 | Uysal et al. | 711/114 |
| 7,093,182 B2 | 8/2006 | Dickson | |
| 7,127,557 B2 * | 10/2006 | Ito et al. | 711/114 |
| 2002/0059539 A1 * | 5/2002 | Anderson | 714/6 |
| 2004/0158833 A1 | 8/2004 | Dickson | |

FOREIGN PATENT DOCUMENTS

| | | | |
|---|---|---|---|
| GB | 2343265 A | 5/2003 | |
| WO | WO 01/10043 A | 2/2001 | |

OTHER PUBLICATIONS

European search report in EP05250790.2, EPO Jun. 26, 2007.

* cited by examiner

*Primary Examiner*—Robert Beausoliel
*Assistant Examiner*—Charles Ehne
(74) *Attorney, Agent, or Firm*—Chen Yoshimura LLP (57) ABSTRACT

A general RAID conversion method is described for converting between different RAID configurations. The method includes reading a unit of user data from the source devices according to the source RAID algorithm, writing the user data together with redundant data (if any) to the target devices according to the target RAID algorithm, and from time to time releasing portions of the source devices containing data that has been converted. The conversion may be used to expand or contract the array, to increase or decrease usable capacity, and to increase or decrease the device-loss insurance level. Conversion may be performed on line (dynamically) or off line. The flexibility of the method allows the implementation of manual and/or rule-based RAID reconfiguration that automatically adjusts system parameters based on user request and/or a set of rules and conditions respectively. It may also be used to perform self-healing after one or more devices in the array have failed.

2 Claims, 7 Drawing Sheets

METHOD AND APPARATUS FOR RAID CONVERSION

This application is related to U.S. Pat. No. 6,557,123, issued Apr. 29, 2003 and U.S. Pat. No. 7,093,182, issued Aug. 15, 2006, both of which are incorporated by reference herein in their entirety.

BACKGROUND OF THE INVENTION

1. Field of the Invention

This invention relates to RAID (Redundant Array of Inexpensive (or Independent) Disks (or Devices)) systems, and in particular, to method and apparatus for converting between different species of RAID's and rule-based RAID reconfiguration.

2. Description of the Related Art

RAID is a data storage system that provides a certain level of redundancy so that a certain number of disks (devices) of the disk (device) array may be lost without any loss of user data stored thereon. Various species of RAID systems are known, including RAID0, RAID1, RAID3 and RAID5 (known as standard RAID), and RAID2, RAID4 and RAID6 (known as non-standard RAID). Methods and apparatus that provide conversion or migration between different conventional RAID species have been described. For example, U.S. Pat. No. 6,275,898 describes converting from RAID5 to RAID1 (a contraction, or reduction of the usable capacity of the system, referred to as "promotion" in that patent) and converting from RAID1 to RAID5 (an expansion, or increase of the usable capacity of the system, referred to as "demotion" in that patent). The conversion must be done off line, i.e. the system cannot take user request while performing the conversion. In the context of this patent "RAID1" includes the compound RAID, which we call "RAID10". U.S. Pat. No. 6,154,853 describes a special case of an "even" conversion (where the usable capacity in the system is unchanged), by converting an n-disk RAID5 to a 2(n-1) disk RAID10 and back. U.S. Pat. No. 5,524,204 and U.S. Pat. No. 5,615,352 describe a method for expanding a RAID5 to a bigger RAID5 with a larger number of disks. The conversion may be accomplished without interrupting service, i.e. while the system is online. These two patents do not describe an array contraction.

SUMMARY OF THE INVENTION

Accordingly, the present invention is directed to a method and apparatus for RAID conversion that substantially obviates one or more of the problems due to limitations and disadvantages of the related art.

An object of the present invention is to provide a flexible approach to RAID conversion and reconfiguration.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a method for RAID conversion in a redundant array of inexpensive devices (RAID) comprising a controller and a plurality of storage devices for storing user data, the controller storing a plurality of RAID algorithms to be implemented for writing data to and reading data from the storage devices, the method includes storing in the controller one or more rules for selecting a desired one of the plurality of RAID algorithms based on one or more conditions of the array; detecting the one or more conditions of the array; selecting the desired RAID algorithm based on the detected conditions and the stored rules; and when the desired RAID algorithm is different from the RAID algorithm currently implemented in the array, automatically converting the array from the currently implemented RAID algorithm to the desired RAID algorithm.

In another aspect, the present invention provides a RAID system configured to carry out the above method steps. In yet another aspect, the invention provides a computer software product for implementing the above method steps in a RAID system.

It is to be understood that both the foregoing general description and the following detailed description are exemplary and explanatory and are intended to provide further explanation of the invention as claimed.

DETAILED DESCRIPTION OF THE PREFERRED EMBODIMENTS

A new species of RAID, hereinafter referred to as "RAIDn", is described in commonly assigned U.S. Pat. No. 6,557,123, entitled "Data redundancy methods and apparatus", issued Apr. 29, 2003. U.S. Pat. No. 6,557,123 describes a data storage apparatus having a plurality of n disks, where data comprising a plurality of data groupings are stored respectively across the plurality of n disks. Each one of the n data groupings comprises a data portion and a data redundancy portion. Advantageously, the n data portions are recoverable from any and all combinations of n-m data grouping(s) on n-m disk(s) when the other m data grouping (s) are unavailable, where $1 \leq m < n$. The disk storage apparatus may be configured for a parameter m which is selectable. In other words, the RAIDn method allows a user to select the level of redundancy (or "device-loss insurance") in the disk array. (For convenience, a notation "n:m" or "(n,m)" is used hereinafter to denote the parameters n and m in a RAIDn.) In particular, U.S. Pat. No. 6,557,123 describes a new family of codes, referred to as "Wiencko codes" (pronounced "WEN-SCO" codes), which also enables the RAIDn algorithms. A related method is described in U.S. Pat. No. 7,093,182, issued Aug. 15, 2006, which is a continuation-in-part of U.S. Pat. No. 6,557,123. U.S. Pat. No. 7,093,182 describes method and apparatus for providing data recovery in a one or multiple disk loss situation using a set of codes similar to but different from the Wiencko codes. Further, an implementation method for RAIDn is described in U.S. Patent Application Pub. No. 2004/0158833, published Aug. 12, 2004. The disclosures of the above three U.S. patents and patent applications are herein incorporated by reference in their entirety.

As used in the present application, "RAIDn" is a RAID system according to the principles described in U.S. Pat. No. 6,557,123 and/or U.S. Pat. No. 7,093,182, i.e., a RAID system where the level of redundacy is selectable or adjustable. "Conventional RAID", on the other hand, is used in the present application to refer to conventionally known RAID species such as RAID0, RAID1, RAID3, RAID5, RAID6, RAID2 and RAID4, and/or compound RAID's where any of the above RAID types are combined. "RAID" is used to generally refer to any RAID systems, including conventional RAID and RAIDn systems.

Although the term disk is used in the present application, the method and apparatus are not limited to disks, but the RAID may comprise any type of suitable devices for data storage, including but not limited to magnetic disks, magnetic tapes, optical discs, memory, any block devices, servers, NAS (network attached servers) systems, JBOD's (Just a Bunch of Disks), clustered servers, etc. This application uses the term "disk", "drive" and "device" interchangeably, unless otherwise specified, without affecting the scope of the description. At least the term "device" should be understood to encompass all suitable storage devices including but not limited to those listed above.

Embodiments of the present invention provide RAID conversion methods and apparatus for converting (or migrating) between a conventional RAID and a RAIDn system, and/or converting between two RAIDn systems. Other aspects of the invention include applications of rule-based RAID conversion where both RAID systems may be either a RAIDn or a conventional RAID. For convenience, the RAID system before a RAID convention is referred to as the source RAID and the RAID system after the conversion is referred to as the target RAID.

According to embodiments of the present invention, the RAID conversion may be an expansion where the number of disks in the array increases, or a contraction where the number of disks in the array decreases. The conversion may either increase or decrease usable capacity, which is defined as the total capacity of the system usable for storing user data. The conversion may either increase or decrease the number of total disks in the array. The conversion may either increase or decrease device-loss insurance, which is defined as the maximum number of disks that may fail without the loss of user data. The conversion may translate between two different RAID/RAIDn species whose physical characteristics (i.e. Number of devices, device-loss and/or usable capacity) remain the same; this flexibility of the system allows implementation of rule-based RAID reconfiguration that automatically adjusts one or more system parameters based on a prescribed set of rules and conditions. In particular, RAID conversion may be used to perform self-healing after one or more devices in the array failed, in which situation the source array will be the remaining devices of the original RAID (from which all user data can be reconstructed), and the target array will be either a reconfigured RAID on the same remaining devices or an array that includes replacement devices for the failed devices. In addition, the conversion may be performed either in an on line fashion (i.e. dynamically), where the system will accept and process user I/O requests while performing the conversion, or in an off line fashion, where the system will not accept and process user I/O requests while performing the conversion.

Figure 1A:
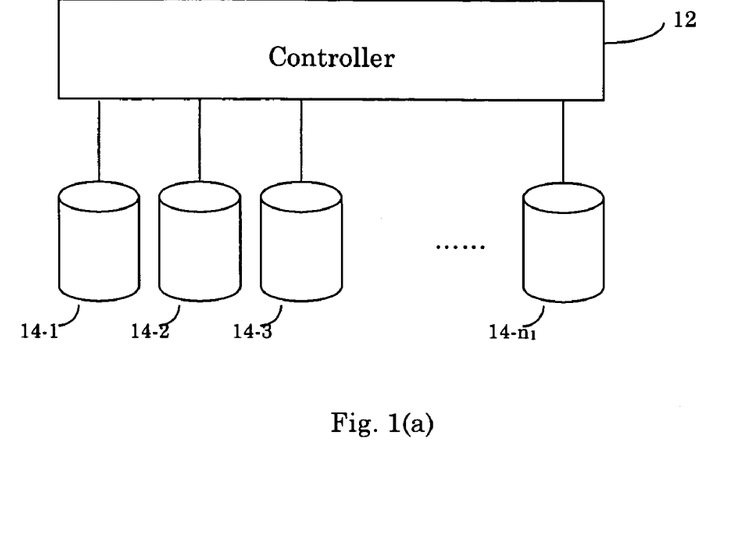
FIGS. 1(a) and 1(b) are schematic diagrams showing a RAID system before and after an RAID conversion.
Figure 1B:
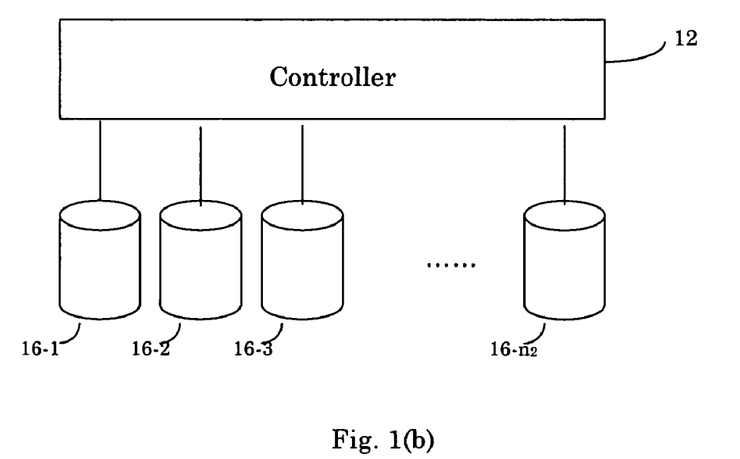

Referring now to FIG. 1(a), a RAID system includes an array of n1 storage devices 14-1, 14-2, . . . 14-i, . . . 14-n1 connected to a controller 12. A controller useful in embodiments of this invention can be either a physical "Hard Ware" device or a virtual "Software loadable module" managing the RAID functions. FIG. 1(b) shows the system after a RAID conversion, where the array now comprises an array of n2 devices 16-1, 16-2, . . . 16-j, . . . 16-n2. The controller 12, which preferably includes a processor or logic circuits, implements a plurality of RAID algorithms, controls the read and write operations of the devices 14-i or 16-j, and carries out the RAID conversion. The controller 12 is also connected to a host device via any suitable interface device (not shown), for receiving read and write requests from the host, and transmitting or receiving user data to or from the host. The invention does not impose any requirement on the physical identity of the source devices 14-i and target devices 16-j. When the source array and the target array share some of the same physical devices, RAID conversion involves reading data from portions of some devices (as source devices) and writing data to unused portions of the same physical devices (as target devices). When the source array and the target array are separate and distinct physical devices, the RAID conversion may be referred to as replication, and involves copying of user data from the source array to the target array which may be configured as a different RAID.

RAID conversion methods according to embodiments of the present invention generally involves the following steps (FIG. 2): (1) reading a predefined amount of user data from the source devices according to the RAID algorithm implemented in the source RAID; (2) writing the user data together with redundant data (if any) to the target devices according to the RAID algorithm implemented in the target RAID; and (3) releasing portions of the source devices containing data that has been converted and making such portions available for use as target devices. The read step (1) includes, when appropriate, decoding the received data according to the source RAID algorithm to obtain user data. The write step (2) includes, when appropriate, calculating redundancy date from the user data according to the target RAID algorithm. The write step may include a step of verifying the data written onto the target RAID. During conversion, a watermark is maintained for the source array to indicate the conversion progress. This allows the read and write steps to be carried out for a unit of data at a time, so that user I/O requests can be handled during conversion. The read and write steps are repeated until all data is converted. The capacity release step (3) may be carried out from time to time or when necessary, depending on the amount of unused capacity in the physical device.

Figure 2:
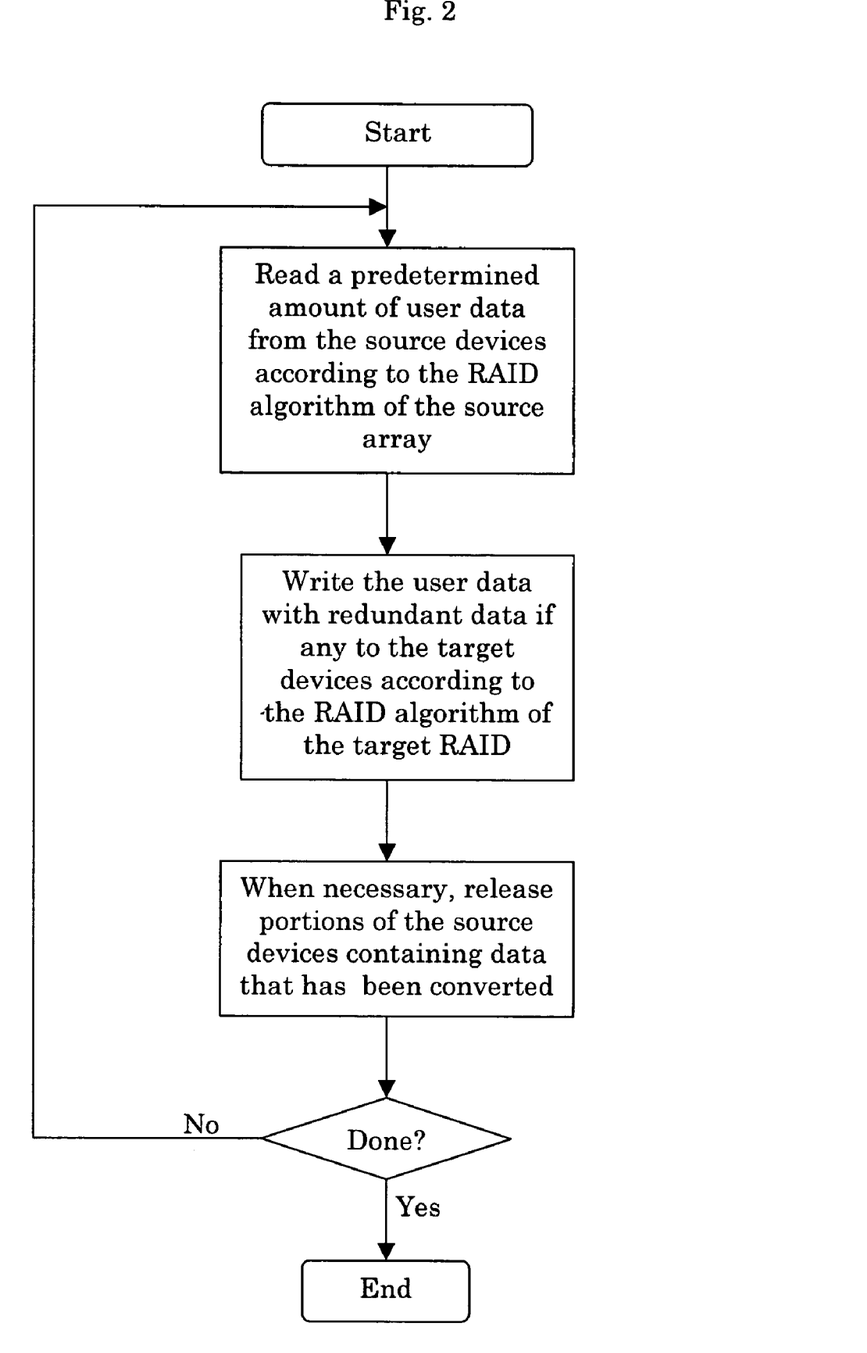
FIG. 2 is a flow chart illustrating a method for RAID conversion.

In the write step, the data may be optionally written to a scratch area to avoid "write holes". A known problem in RAID systems, "write holes" refer to possible interruptions of multi-step sequences that may cause data integrity problems. For example, during writing of a data stripe across a RAID5 array, data may be lost if a power failure occurs before sufficient data has been written to enable recovery of the entire stripe. Writing updates to a scratch area substantially eliminates the write hole problem.

Figure 3A:
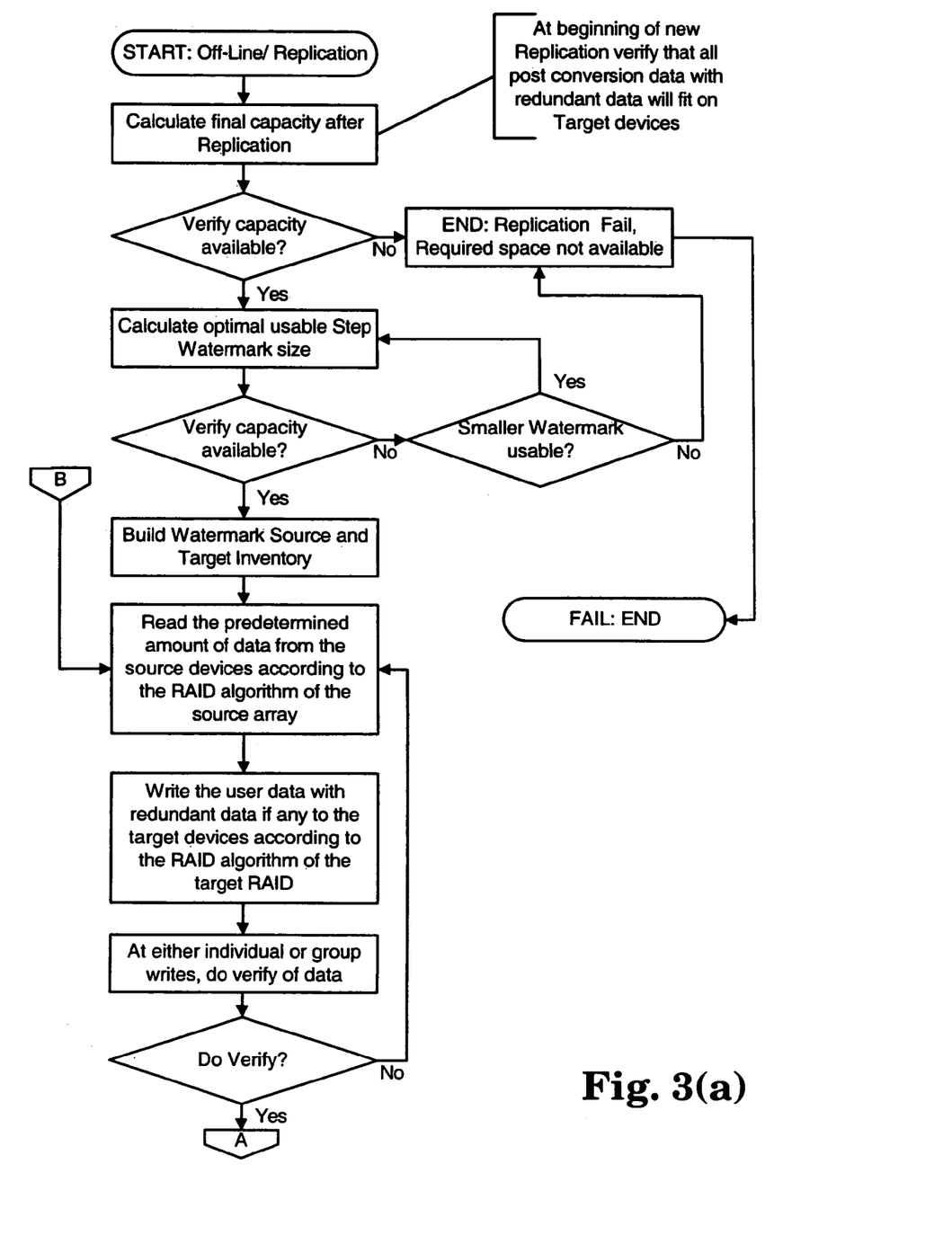
FIGS. 3(a) and 3(b) are a flow chart illustrating a method for off-line replication.
Figure 3B:
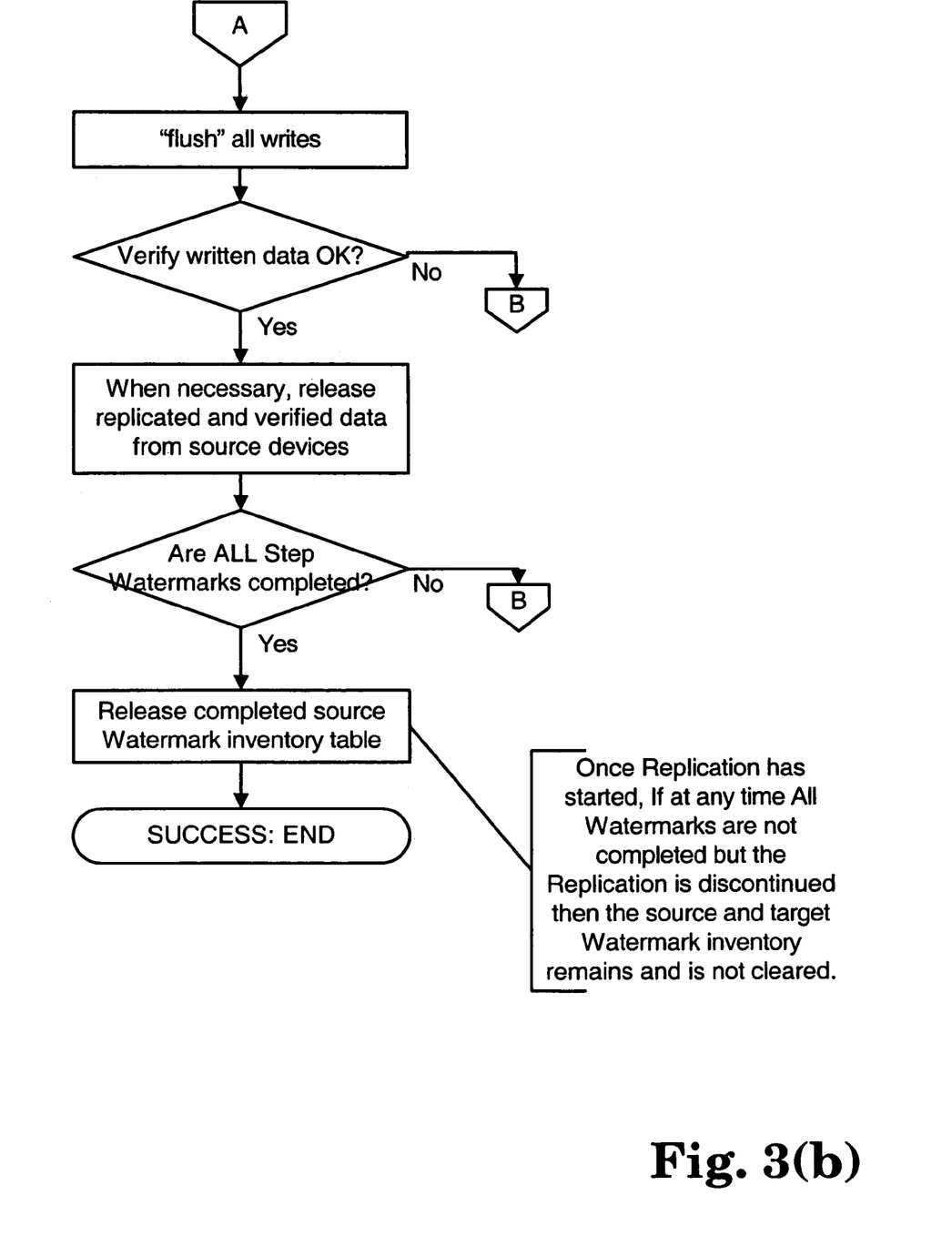
Figure 4A:
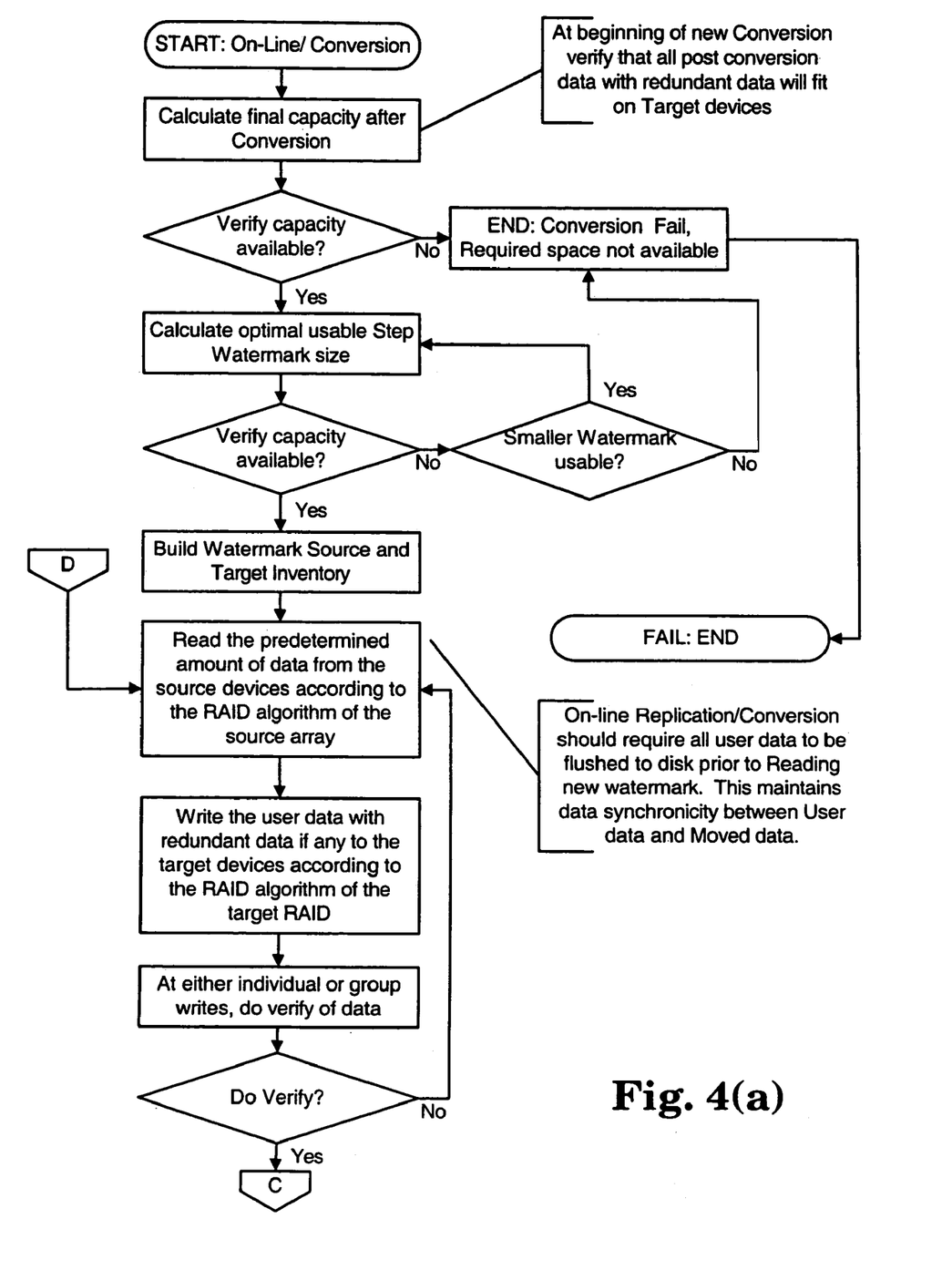
FIGS. 4(a) and 4(b) are a flow chart illustrating a method for on-line conversion.
Figure 4B:
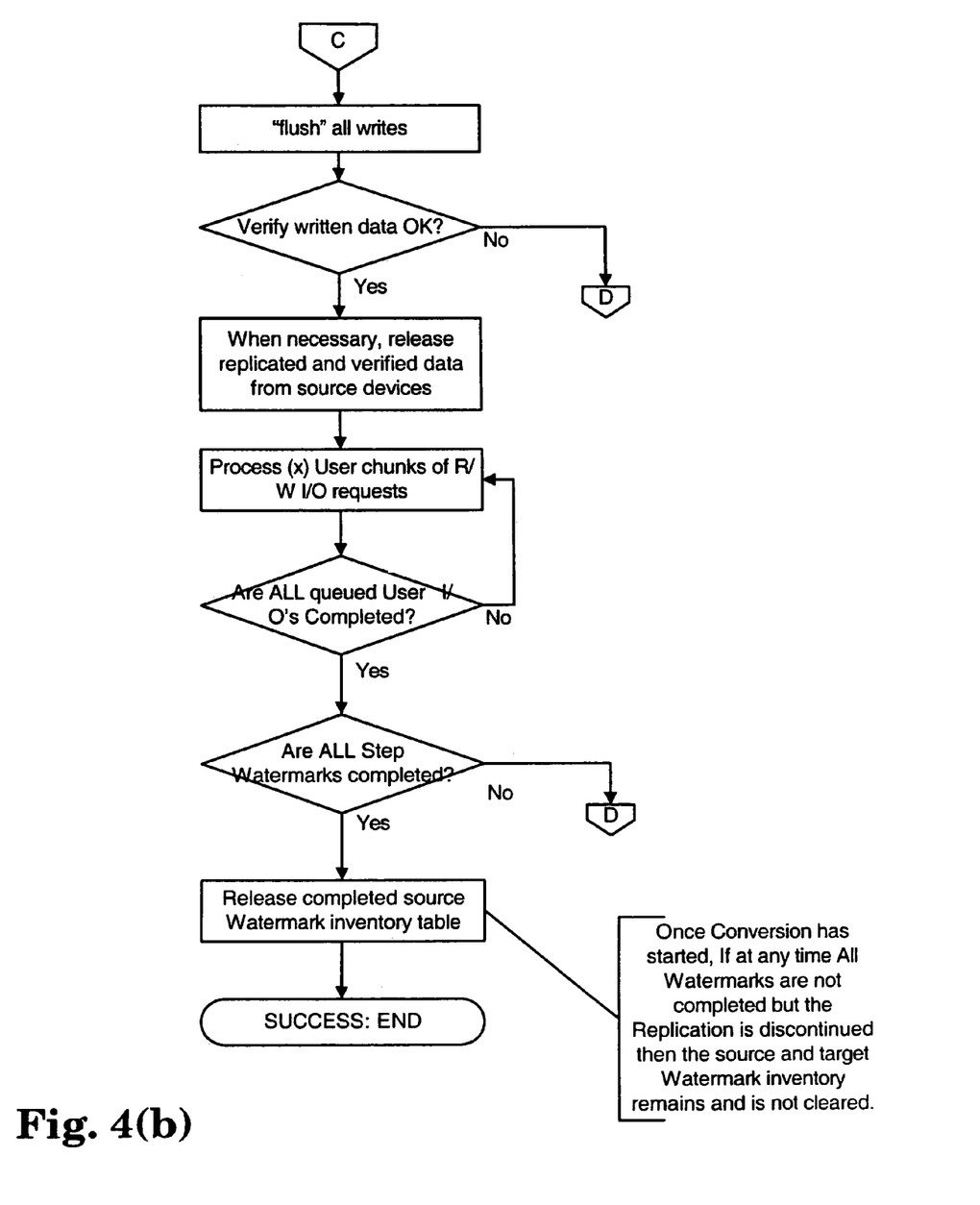

FIGS. 3(a) and 3(b) illustrate an off-line replication method, and FIGS. 4(a) and 4(b) illustrate an on-line conversion method. Both methods are specific examples of the more general method described in FIG. 2.

The conversion method according to embodiments of the present invention is described in more detail below using a specific example. In this example, it is assumed that the number of bytes in any data chuck is a power of 2. (Generally, the data chunks, chunk sizes, chunk boundaries and byte offsets may be of any defined values and the present invention is not limited to the specifics of this example given here.) When chunk sizes are not fixed, it is assumed that a larger size chunk always starts on chunk boundary of any smaller size chunk. In fact, absolute byte offset of chunk start is a multiple of chunk size. It is also assumed that virtual stripes start at a multiple of their size in absolute byte offset.

Any virtual stripe size is an integer multiple of a chunk size, and therefore any two abstract RAID's (conventional RAID or RAIDn), have a least common multiple which is an exact integer multiple of both their chunk sizes. Watermarks at absolute byte offsets equal to integer multiples of this least common multiple are used as virtual stripe boundaries for both abstract RAID's. These are referred to herein as "shared stripe boundaries". For example, a virtual stripe on a 9:2 RAIDn is 63 chunks, while a virtual stripe on a 9-disk RAID5 is 8 chunks. The least common multiple will be 504 chunks, or about 2 megabytes with 4 Kbyte chunks. Conversion is preferably carried out in units of virtual stripes, as follows.

First, a subset of possible shared stripe boundaries is defined as "step watermarks". The step watermarks should be spaced so that full conversion between neighboring step watermarks takes a desired amount of time, such as on the order of $1/10$ second, or less. The controller 12 alternates (e.g. on the order of once a second) between a converting state and a user I/O state. When entering the converting state, the controller flushes all pending user requests to the array, with the cooperation of the upper level driver connected to the controller 12, so that no I/O to this array is issued while the state remains converting. Preferably, the upper level driver either sends a pause, which will not return until, or the driver can queue user requests until, the entire conversion to the next step watermark is completed. The controller then converts the data from the source array to the next step watermark. The new watermark is stored in the controller, the controller flushes watermark data and the controller enters the user I/O state. During user I/O state, normal user I/O takes place to the array with the watermark fixed at its new location. Since the watermark location indicates which portions of the data has been converted and hence exist on the target RAID, and which portions of the data have not yet been converted and hence exist on the source RAID, user read requests can be handled appropriately by reading data from either the source RAID or the target RAID. User write requests are preferably handled by writing data onto the target array with an appropriate watermark indicating the boundary of such data. The above steps are repeated until all the data is converted.

The above-described method may involve small pauses in data availability to the users, but is relatively easy to implement. Alternatively, if smoother data availability is to be maintained during conversion, a moving RAID0, RAID1, RAID10, or some other RAID section embracing at least two steps may be implemented, preferably on a separate storage device such as a solid-state disk or battery backed memory. By placing an intermediary RAID device and/or cache between new user I/O and the target array during the step watermark I/O operation substantially eliminates all potential user I/O pauses. Additionally this would eliminate "write holes" even if there are pauses.

Figure 5:
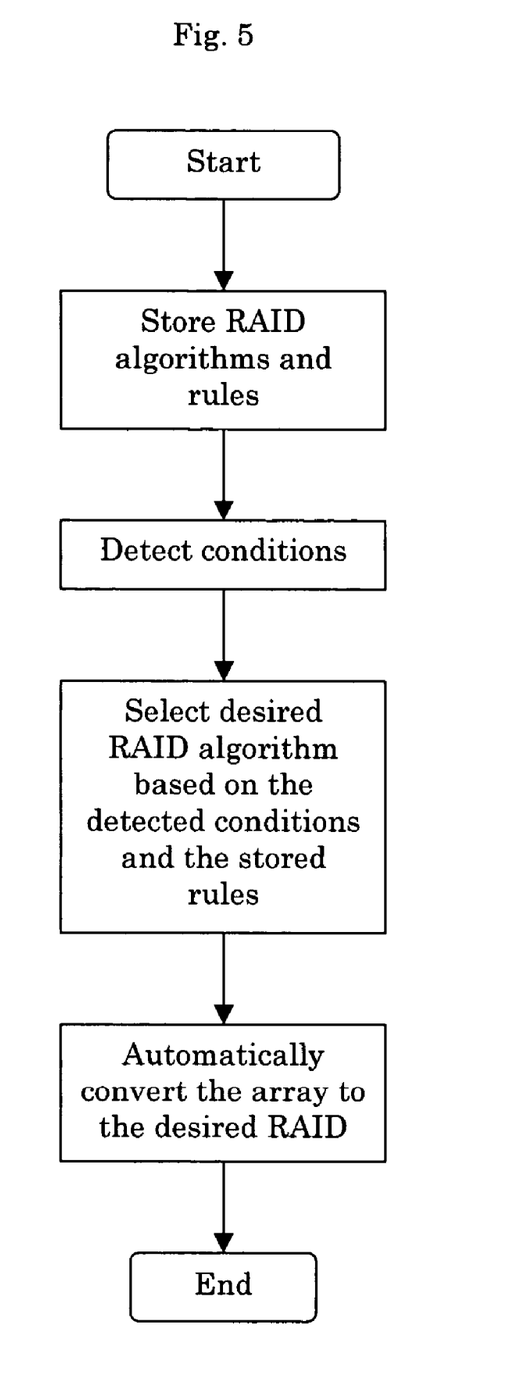
FIG. 5 is a flow chart illustrating a rule-based RAID conversion method.

The RAID conversion method described above may be applied where the source and target RAID's may be any species of RAID, including conventional RAID's and RAIDn with any desirable n:m parameters. As a result, the RAID conversion method is flexible and general in that it can implement a contraction as well as an expansion, with increased or decreased usable capacity and increased or decreased device-loss insurance. Further, conversion may be carried out either on-line (dynamically) or off-line. This flexibility allows practical applications for reconfiguring RAID systems not offered by conventional conversion methods. One category of such applications is rule-based RAID reconfiguration. Rule-based reconfiguration may be implemented by storing a set of rules in the controller (or in an upper level user application), which causes automatic conversion (reconfiguration) of the RAID system when certain conditions are met (FIG. 5). Some examples of rule-based RAID conversion include:

Capacity utilization-based rules. Device-loss insurance level may be automatically adjusted, between a minimum and a maximum level set by the user, based on capacity utilization (i.e. amount of total device capacity that is utilized by user data). For example, a 20-drive array may be set to have a maximum insurance level of 5 disks and a minimum insurance level of 2 disks. If the utilization of available capacity of the array is at or below 50%, the RAID is configured as 20:5; if the capacity utilization is between 50% and 60%, the RAID is configured as 20:4; etc. Additionally idle drives can be added to maintain both capacity and insurance by using a predetermined number of idle drives and/or idle drives know as Global spares.

Performance requirement-based rules. Different species of RAID's have different performance in terms of read and write speeds. For example, RAID0 had the fastest performance for both reads and writes but no safety. The level of device-loss insurance in RAIDn affects write performance to a certain degree and affects read performance to a lesser degree. A rule may be defined to increase or decrease the insurance level based on performance requirements. If, for example, from RAID0 each one disk of insurance increase results in a write penalty of 10%, and if a performance level of 60% of the maximum performance is acceptable, then the device-loss insurance may be set as high as 4. The RAID may be automatically reconfigured when the performance requirement changes.

Self-healing fixed insurance. Rules may be set up so that the RAID will automatically add devices and/or borrow usable capacity from the array to maintain a certain level of device-loss insurance. For example, if an insurance level of 3 is always to be maintained, and one device in a 9-device array fails, the remaining 8 devices may be reconfigured into an 8:3 RAIDn (assuming total capacity is adequate). Alternatively, if a spare device is available, it may be added to the 8 remaining devices and reconfigured into a 9:3 RAID.

Self-healing minimal insurance. A RAID system may be supplied by a supplier and set to an initial high level of insurance. As devices fail, self-healing is performed to reconfigure the remaining devices, until a minimal insurance threshold is reached which triggers a maintenance call. This may be especially useful when a preventive maintenance contract is in place as it reduces the number of maintenance calls to the user site, and/or allows maintenance to be performed at a desired time during a window instead of at each device failure.

Data criticality-based rules. Device-loss insurance level may be automatically adjusted, between a minimum and a maximum level set by the user, based on the importance of the user data. Such rule-based settings will dynamically change from higher insurance (for more important data) to lower insurance (for less important data) and vice versa. Data criticality may be measured or defined by any suitable methods such as the class of user, the use of directories that are designated at higher insurance levels, files marked with higher priorities etc.

Data recency and repetition-based rules. Device-loss insurance level may be automatically adjusted, between a minimum and a maximum level set by the user, based on recency and repetition (R&R) of the user data. Such rule-based setting will dynamically change from higher insurance (for higher R&R) to lower insurance (for lower R&R) and vice versa. R&R may be measured or defined by any suitable methods such as the number of files R/W over a period of time and/or the number of accesses of one or more files over a period of time.

Device vulnerability-based rules. Device-loss insurance level may be automatically adjusted, between a minimum and a maximum level set by the user, based on the device type, vulnerability of the type of device, and/or location of the user data (for example. the location of user data may be in remote locations such as mobile offices, home offices, remote offices etc., or a managed data center). Such rule-based settings will dynamically change from higher insurance (for more vulnerable devices) to lower insurance (for less vulnerable devices) and vice versa.

In the above rule-based RAID conversion methods, each of the source and target RAIDs may be a conventional RAID or a RAIDn.

It will be apparent to those skilled in the art that various modification and variations can be made in the RAID conversion methods and apparatus of the present invention without departing from the spirit or scope of the invention. For examples, although a set of possible rules are described, the invention is not limited to these rules and any suitable rules may be used. Thus, it is intended that the present invention cover modifications and variations that come within the scope of the appended claims and their equivalents.

What is claimed is:

1. In a redundant array of inexpensive devices (RAID) comprising a controller and a plurality of storage devices for storing user data, the controller storing a plurality of RAID algorithms to be implemented for writing data to and reading data from the storage devices, a RAID conversion method for converting the away from a first RAID algorithm to a second RAID algorithm, comprising:

alternating between performing tasks in a conversion state and performing tasks in a user I/O state, wherein the tasks in the conversion state include:

(a) reading a unit of user data from the storage devices according to the first RAID algorithm;

(b) defining a watermark indicating the position where the data is read from the first RAID; and (c) writing user data on appropriate storage devices according to the second RAID algorithm, wherein steps (a) and (c) are repeated to read and write data up to the watermark, and wherein the tasks in the user I/O state include reading data from the storage devices upon user requests, wherein when requested data exist on both sides of the watermark, the requested data is read according to the second RAID algorithm before the watermark and according to the first RAID algorithm after the watermark; and wherein the conversion state and user I/O state are repeated until all data on the storage devices are converted.

2. The method of claim 1, wherein the writing step includes writing updates to a semi-permanent cache.

* * * * *